July 11, 1961 E. M. BURDICK 2,992,093
PROCESS FOR TREATING HUMUS MATERIALS
Filed March 6, 1958
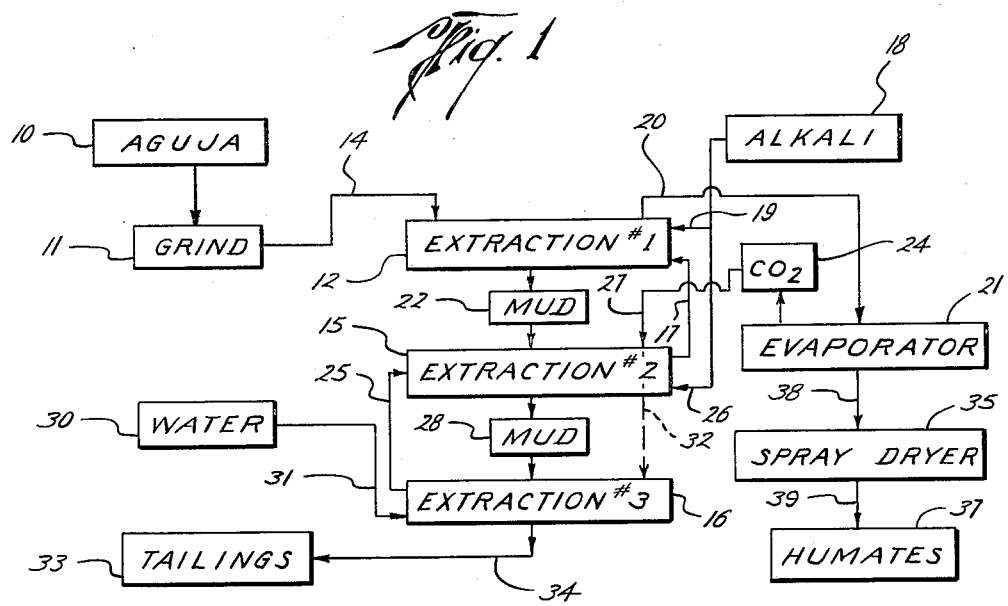
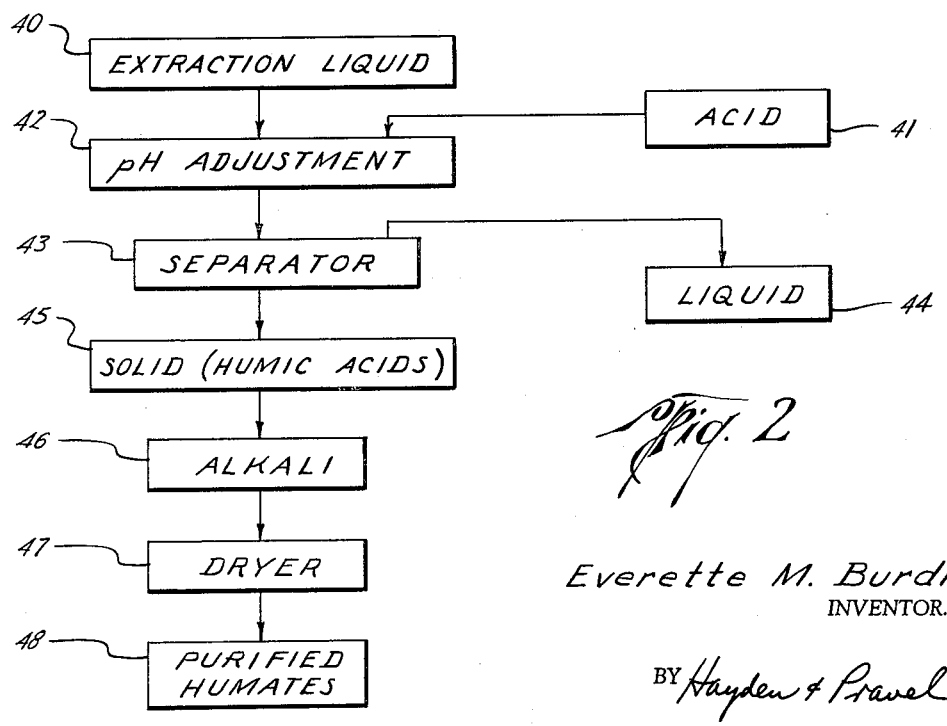
Everette M. Burdick
INVENTOR.
BY Hayden & Pravel
ATTORNEYS

# United States Patent Office 2,992,093
Patented July 11, 1961

2,992,093
PROCESS FOR TREATING HUMUS MATERIALS
Everette M. Burdick, 4821 Ronda St., Coral Gables, Fla.
Filed Mar. 6, 1958, Ser. No. 719,544
9 Claims. (Cl. 71—24)

This invention relates to new and useful improvements in processes for treating humus materials, and particularly in processes for producing humates for use as soil conditioners and fertilizers.

Humus is partially decayed organic matter which is built up in soil by the natural decaying which occurs. The chemical structure of such humus is not fully known but it is known that such humus is the dark colored material present in fertile soils and it is generally believed that humus is composed of high molecular weight acids.

Rich sources of humus or humic acids include the peats, mucks, forest soils, brown coals and lignites. The humus containing materials have all been formed from living cells of all kinds, plants, animals, microorganisms, and especially marine life such as planktons, diatoms and algae. These materials are generally not suitable in most cases to use directly as soil conditioners and fertilizers for various reasons and a great amount of effort has been expended to alter them both chemically and biologically so they will be more effective but without much success.

It is one object of this invention to provide a new and improved process for treating humus materials to extract the components therefrom which are effective for use as soil conditioners or fertilizers.

An important object of this invention is to provide a new and improved process for separating humates from humus materials and for concentrating same in a form which can be added directly as needed to soils.

It is another object of this invention to separate the humus materials from the minerals present in such rich deposits as Aguja, peats, mucks, brown coals, lignites, and partially decayed plant and animal cells and their tissues.

Another object of this invention is to produce various humates, such as ammonium humate, potassium humate and sodium humate, each of which is water soluble or dispersible and possesses the desirable colloidal soil conditioning and fertilizing properties.

Another object of this invention is to produce humic acids in a high state of purity, that is, free or essentially free of most common soil minerals.

Still another object of this invention is the production of various salts of humic acids, such as the following: iron humate, magnesium humate, manganese humates, copper humates, boron humates, cobalt humates, molybdenum humates and calcium humates.

A further object of this invention is to produce these various humates in a neutral form so that they can be applied not only to soils, but to any part of growing plants such as their roots, leaves and stems.

A still further object of this invention is to provide a method of producing on a large scale soluble or water dispersible salts of humic acids, essentially free of soil minerals.

A preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is a flow diagram illustrating the steps of the process of this invention; and FIG. 2 is a flow diagram illustrating additional steps in the process of FIG. 1 which may be used in conjunction therewith for purifying the product obtained by the steps illustrated in FIG. 1.

In FIG. 1 of the drawings, the preferred embodiment of this invention is illustrated by a flow diagram. Stated briefly, such flow diagram of FIG. 1 illustrates the extraction and concentration of humates from a humus material such as Aguja. Such extraction is accomplished, as will be explained more in detail hereinafter, by a three-stage extraction process based on a countercurrent flow. It has been found that with the process illustrated in FIG. 1, the humates are substantially all separated from tne humus material and are produced in a form suitable for use with soils as a soil conditioner or fertilizer. Under certain circumstances, it is desirable to further purify the humates produced by the process steps illustrated in FIG. 1, and in such case, the additional steps of FIG. 2 of the drawings may be carried out in order to produce further purified humates. Also, with the additional steps illustrated in FIG. 2, as will be explained more in detail hereinafter, various metallic humates, and especially those that are known to have roles in the metabolic functions of plants and animals, are produced.

In carrying out the process or method of this invention as illustrated in FIG. 1 of the drawings, the starting material is the Aguja or other humus material. The soil mineral called Aguja is preferred because it contains from about 10% to about 45% of humate material which can be extracted by the process of this invention, but it is to be understood that this invention is not limited to the extraction of the humates from Aguja since other humus materials such as peats, mucks, forest soils, brown coals, and lignites could be treated by the process of this invention for the extraction and concentration of the humates therefrom.

In any event, the Aguja or other humus material indicated by the numeral 10 in FIG. 1 of the drawings is preferably passed to a grinder of any conventional or known construction to perform the grinding step 11. The ground Aguja is introduced into the first extraction unit 12 through line 14. Liquor which is obtained from the previous extractions in the extractors or extracting steps 15 and 16 is introduced through line 17 to the first extraction step or unit 12. Also, alkali 18 is introduced to the first extraction step or unit 12 through line 19. Normally, ammonia in the form of ammonium hydroxide is introduced through line 19 to the first extraction step 12 in sufficient quantity to maintain approximately a 2% by weight concentration of ammonia during the extraction step 12. Such 2% by weight concentration of ammonia will maintain the pH in the extraction step or unit 12 at about 9. In order to obtain adequate extraction, it is important that the pH of the liquid in the extraction 12 is above about 9. It will therefore be appreciated that the exact concentration of the alkali introduced from the source 18 through the line 19 may vary considerably so long as it is adequate to bring the pH of the solution in the extraction step 12 up to above about 9. The mixture in the first extraction step or unit 12 is thoroughly agitated for a period of about two hours and then is allowed to settle so that the solids settle to the bottom leaving a supernatant liquor which is taken off the extraction unit 12 through line 20 to an evaporator 21, as will be more fully explained. The exact period of time for the agitation in the first extraction step or unit 12 may vary depending upon the particular humus material which is being treated, but the above recommended time of about two hours has been found to be sufficient under most circumstances.

The solids from the first extraction unit or step 12 are removed therefrom and are identified in FIG. 1 as mud 22 which is passed to the second extraction unit or step 15. In such second extraction step or unit 15, liquor from the third extraction step or unit 16 is introduced through line 25, and also alkali is introduced through line 26 so that the pH of the solution in the second extraction 15 is maintained above about 9 and with ammonia as the alkali, there would be apprixmately 2% by weight concentration of ammonia in solution. It may be unnecessary to add any alkali through line 26 to the extraction step or unit 15, but whether or not such ammonia is necessary can be readily determined by laboratory tests which will indicate whether or not all of the humic acids from the original humans material or Aguja has been rendered soluble. The liquor and the mud in the second extraction step 15 are agitated thoroughly, preferably for a period of about two hours and when it has been determined that all of the humates have been rendered soluble or have been soulbilized, the carbon dioxide ($CO_2$) or other volatile acid such as $H_2CO_3$, HCl or $HNO_3$ is introduced from line 27 to unit 15 to neutralize any excess alkali present. The $CO_2$ is normally utilized in this invention because it is available from the evaporator 21, as will be explained. After agitation in the extraction step or unit 15, the mixture is allowed to settle and the supernatant liquor is taken off through line 17 to the first extraction step or unit 12 as explained previously.

The mud or solids 28 from the second extraction unit or step 15 are passed to the third extraction unit or step 16. Such mud 28 in the extraction step or unit 16 is thoroughly washed with water introduced from a source 30 through line 31 to the unit 16. As indicated by the dotted line 32, some $CO_2$ or other volatile acid may be introduced into the third extraction step or unit 16 to be certain that such extraction is accomplished in a neutral state. The mud introduced from 28 and the water introduced through line 31 are thoroughly agitated in the third extraction 16 for a period of about two hours, although a slightly shorter period may be suitable. Thereafter, the mixture is allowed to settle and the supernatant liquid is taken off through line 25 for the second extraction step 15, as explained above. The washed mud is discharged as tailing 33 through line 34 along with some of the water. The tailings 33 would of course be largely the mineral material from the original humus material 10 and would normally be undesirable insofar as the present invention is concerned.

Considering now the treatment of the extracted humates which are in solution and which are in the liquor leading from the extraction unit 12 through line 20 to the evaporator 21, such liquor is evaporated by any known type of evaporator unit. However, it is preferable to use a known type of submerged burner for the evaporation at 21 so that the $CO_2$ as indicated at 24 may be produced for use and introduction through line 27 to the second extraction step or unit 15. However, as previously noted, if the $CO_2$ is not produced from the evaporator 21, a volatile acid may be utilized instead of the $CO_2$. Most of the water is removed in the evaporator 21 and final drying of the humates is accomplished in a spray dryer 35 of any known construction. The humates are then in a black powder form and are discharged as the product 37 which is in a suitable form for use as a soil conditioner or a fertilizer. The particular form of the humates 37 will depend upon the particular alkali introduced from the source 18 into the process of this invention. For example, if ammonia or ammonium hydroxide is the alkali at 18, the resulting humates will be ammonium humates. On the other hand, if the alkali is potassium hydroxide, then potassium humates will be produced at 37 and similarly if the alkali is sodium hydroxide the humates will be sodium humates at 37. Thus, it is believed evident that the particular humates 37 which are produced can be varied or controlled by the particular alkali introduced from 18.

In order to understand the quantities of materials which may be involved in carrying out the process illustrated in FIG. 1 of the drawings, it will be assumed that it is desired to produce approximately one ton or two thousand pounds of ammonium humates at 37 as the product. Under such circumstances, approximately ten thousand pounds of Aguja would be introduced at 10 and through line 14 to the first extraction step 12. Approximately two hundred pounds of ammonia would be introduced through line 19 to the extraction step or unit 12. There would also be approximately four thousand gallons of liquor introduced into the extraction step or unit 12 to the line 17 from the previous extractions 15 and 16. Such mixture would, as explained above, be thoroughly agitated and preferably for about two hours and then it would be allowed to settle. The separation would take place as previously explained so that the supernatant liquor from the first extraction 12 is taken off through line 20 to the submerged burner or other evaporator 21. There would be approximately thirty-four hundred gallons of liquor passing through line 20 to the evaporator 21 and in the evaporator step 21, approximately twenty-nine hundred gallons of water will be evaporated and then the spray dryer 35 will remove the remaining five hundred gallons of water to leave only the solid product 37.

With regard to the quantities of materials in the first two extraction steps, approximately thirty-four hundred gallons of liquor is introduced through the line 25 to the extraction unit 15. Approximately four thousand gallons of water is introduced through line 31 to the third extraction step or unit 16 and approximately five hundred gallons of water are discharged through line 34 with the tailing 33. The weight of the minerals in the tailings 33 will depend upon the amount of the humate material which is extracted, but assuming that about one ton or two thousand pounds of the humates have been extracted at 37, then there would be about eight thousand pounds of dry minerals discharged as tailings 33.

The above explanation with regard to quantities demonstrates or describes the batch process, but it is believed evident that through the use of centrifuges to effect the separations of the solids and the liquids mentioned in the foregoing description, the process of this invention could be made continuous rather than a batch operation and the invention hereof is not to be construed to be limited to batch operation.

In some instances it may be desirable to further purify the humates 37 and if such is desired, the purification steps illustrated by the flow diagram of FIG. 2 may be carried out. If such purification is desired, an extraction liquid 40 is obtained from the process steps illustrated in FIG. 1. Such extraction liquid 40 may be obtained from line 20, or it may be obtained from line 38 after the liquid has been subjected to a certain amount of evaporation in the evaporator 21. Also, if it is desired to have an even further dried material as the extraction liquid 40, such liquid may even be obtained from the line 39. However, ordinarily, it is more economical to obtain the extraction liquid 40 from the line 20 without the use of the evaporator 21 or the dryer 35.

The extraction liquid 40 is treated with acid 41 as indicated at 42 so as to adjust the pH of the extraction liquid to about 2 or lower whereupon humic acids precipitate. The mixture with the precipitated humic acids is then separated in a separator 43 so as to discharge the liquid and impurities therewith at 44 and the solids at 45. The solids are the desired humic acids and they are then reacted with various alkaline solutions by adding such solids to the alkali 46 to form the various metal humates which are desired. For this purpose, various metallic hydroxides may be used as the alkali 46. For example, the corresponding hydroxides of ammonium, potassium, calcium, magnesium, iron, copper, manganese, boron, molybdenum, cobalt and sodium would produce corresponding metallic humates. The particular metallic humate which is desired as the final product can therefore be regulated or controlled by the selection of the particular alkali 46, and the final use of the product will determine to a large extent the product which is produced in the purification process of FIG. 2 and therefore the alkali 46 which is used in such process.

The metallic humates which are produced by the treatment with the alkali 46 are dried in any known type of dryer 47 and the final dried purified humates are produced as the product 48. The dryer 47 may of course be the evaporator 21 and the spray dryer 35 as illustrated in FIG. 1 or either one of them separately.

In connection with the process of this invention, and particularly those process steps illustrated in FIG. 1 of the drawings, it should be pointed out that the material which is extracted by the multi-stage countercurrent flow of the water or liquor with respect to the humus material are humic acids, the exact structure of which is not known. In any event, when such humic acids are extracted by the water or liquor flowing in the multi-stage countercurrent extraction of FIG. 1, they are then available for reaction with the alkali which is added in the extraction stages to form the humates which are either water soluble or water dispersible and which are therefore removed with the final liquor from the first extraction stage 12 into which the humus material is initially introduced. It should be pointed out that one of the advantages of this process resides in the fact that the alkaline solution 18 which is introduced to the extraction steps or stages may be controlled and may range from very low concentrations to relatively high concentrations. For example, the concentrations of the alkaline solutions may range from about 1% by weight of ammonia or its equivalent to about 10% by weight of ammonia or its equivalent, but the preferred alkaline concentration is about 2% by weight of ammonia or its equivalent.

Another important feature of this invention resides in the fact that the final humates 37 which are produced by the steps illustrated in FIG. 1 of the drawings are in a neutral condition because of the carbonation which results during the submerged combustion evaporation 21. In other words, any alkaline excesses in the liquor which passes to the evaporator are neutralized by the carbon dioxide which is produced as the gas is burned in the submerged combustion evaporator. Such carbonation and therefore neutralization of the humates eliminates any harmful effect which they might have on soils and plants when such humates are used as soil conditioners or fertilizers. Also, the carbonation of the excess alkalies permits the recovery of such alkalies which is of economic importance.

When the various humates produced by the process of this invention are used as soil conditioners, such humates alter the physical characteristics of the soils when applied therewith. For example, tilth or tillability is markedly improved. Also, aggregate formation is improved and it has been found that the moisture retention of the soil can be regulated.

When the humates produced by the process of this invention are used as fertilizers, they supply the organic material which improves plant growth. When ammonium humates are produced, nitrogen is additionally supplied for plant growth, and similarly the potassium humates supply potassium which is known to be beneficial for plant growth. However, regardless of the particular humates formed, they are valuable as fertilizers.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A process for separating humates from humus materials in a solid state and for concentrating said humates for providing soil conditioners and fertilizers, comprising the steps of, introducing water into a multi-stage countercurrent flow with respect to a humus material thereby forming a liquor, agitating the liquid and the humus material in each stage and separating the liquor and the solids in each stage, the liquor separated from each extraction stage having soluble humic acids dissolved therein from the humus material, introducing the liquor from each extraction stage to the previous extraction stage with the final liquor being discharged from the first extraction stage, adding an alkali selected from the group consisting of sodium hydroxide, potassium hydroxide, and ammonium hydroxide to said liquor having humic acids therewith to establish a pH of at least about 9 for creating water dispersible humates in the final liquor from the first extraction stage to which the humus material is introduced, separating said final liquor from the humus material treated, adding to said final liquor a material selected from the group consisting of carbon dioxide, carbonic acid, hydrochloric acid, and nitric acid to thereby neutralize the excess alkali, and thereafter removing substantially all of the water from said humates to produce substantially dry humates.

2. A process for separating humates from humus materials in a solid state and for concentrating said humates for providing soil conditioners and fertilizers, comprising the steps of, introducing water into a multi-stage countercurrent flow with respect to a humus material thereby forming a liquor, agitating the liquid and the humus material in each stage and separating the liquor and the solids in each stage, the liquor separated from each extraction stage having soluble humic acids dissolved therein from the humus material, introducing the liquor from each extraction stage to the previous extraction stage with the final liquor being discharged from the first extraction stage, adding an alkali selected from the group consisting of sodium hydroxide, potassium hydroxide, and ammonium hydroxide to said liquor having humic acids therewith to establish a pH of at least about 9 for creating water dispersible humates in the final liquor from the first extraction stage to which the humus material is introduced, separating said final liquor from the humus material treated, adding to said final liquor a material selected from the group consisting of carbon dioxide, carbonic acid, hydrochloric acid, and nitric acid to thereby neutralize the excess alkali, then drying said liquor to produce said humates as separated solids for use as a soil conditioner and fertilizer, and thereafter using said humates as a soil conditioner and fertilizer without further chemical change in the composition of the humates.

3. A process for separating humates from humus materials in a solid state and for concentrating said humates for providing soil conditioners and fertilizers, comprising the steps of, introducing water into a multi-stage countercurrent flow with respect to a humus material in each stage and separating the liquor and the solids in each stage, the liquor separated from each extraction stage having soluble humic acids dissolved therein from the humus material, introducing the liquor from each extraction stage to the previous extraction stage with the final liquor being discharged from the first extraction stage, adding an alkali selected from the group consisting of sodium hydroxide, potassium hydroxide, and ammonium hydroxide to said liquor having humic acids therewith to establish a pH of at least about 9 for creating water dispersible humates in the final liquor from the first extraction stage to which the humus material is introduced, separating said final liquor from the humus materials treated, then evaporating said final liquor with a submerged burner to neutralize the excess alkali in said final liquor with the carbon dioxide produced by the submerged burner, and thereafter using said humates as a soil conditioner and fertilizer without further chemical change in the composition of the humates.

4. A process for separating humates from humus materials in a solid state and for concentrating said humates for providing soil conditioners and fertilizers, comprising the steps of, introducing water into a multi-stage countercurrent flow with respect to a humus material thereby forming a liquor, agitating the liquid and the humus material in each stage and separating the liquor and the solids in each stage, the liquor separated from each extraction stage having soluble humic acids dissolved therein from the humus material, introducing the liquor from each extraction stage to the previous extraction stage with the final liquor being discharged from the first extraction stage, adding an alkali selected from the group consisting of sodium hydroxide, potassium hydroxide, and ammonium hydroxide to said liquor having humic acids therewith to establish a pH of at least about 9 for creating water dispersible humates in the final liquor from the first extraction stage to which the humus material is introduced, separating the final liquor from the solids in the first extraction stage, adding to said liquor a material selected from the group consisting of carbon dioxide, carbonic acid, hydrochloric acid, and nitric acid to thereby lower the pH of the separated liquor to below about 2 to precipitate humic acids, separating the precipitated humic acids from the remaining liquor and the impurities, and thereafter mixing said humic acids with a metallic hydroxide to form water dispersible humates in a purified form.

5. A process for separating humates from Aguja and for concentrating said humates for providing soil conditioners and fertilizers, comprising the steps of, introducing water into a multistage countercurrent flow with respect to Aguja thereby forming a liquor, agitating the liquid and the Aguja in each stage and separating the liquor and the solids in each stage, the liquor separated from each extraction stage having soluble humic acids dissolved therein from the Aguja, introducing the liquor from each extraction stage to the previous extraction stage with the final liquor being discharged from the first extraction stage, adding an alkali selected from the group consisting of sodium hydroxide, potassium hydroxide, and ammonium hydroxide to said liquor having humic acids therewith to establish a pH of at least about 9 for creating water dispersible humates in the final liquor from the first extraction stage to which the Aguja is introduced, separating said final liquor from the humus material treated, adding to said final liquor a material selected from the group consisting of carbon dioxide, carbonic acid, hydrochloric acid and nitric acid to thereby neutralize the excess alkali, and thereafter removing substantially all of the water from said humates to produce substantially dry humates.

6. A process for separating humates from Aguja and for concentrating said humates for providing soil conditioners and fertilizers, comprising the steps of, introducing water into a multi-stage countercurrent flow with respect to Aguja thereby forming a liquor, agitating the liquid and the Aguja in each stage and separating the liquor and the solids in each stage, the liquor separated from each extraction stage having soluble humic acids dissolved therein from the Aguja, introducing the liquor from each extraction stage to the previous extraction stage with the final liquor being discharged from the first extraction stage, adding ammonium hydroxide to said liquor having humic acids therewith to establish a pH of at least about 9 for creating water dispersible humates in the final liquor from the first extraction stage to which the Aguja is introduced, separating said final liquor from the humus material treated, adding to said final liquor a material selected from the group consisting of carbon dioxide, carbonic acid, hydrochloric acid, and nitric acid to thereby neutralize the excess alkali, and thereafter removing substantially all of the water from said humates to produce substantially dry humates.

7. A process for separating humates from Aguja and for concentrating said humates for providing soil conditioners and fertilizers, comprising the steps of, introducing water into a multi-stage countercurrent flow with respect to Aguja thereby forming a liquor, agitating the liquid and the Aguja in each stage and separating the liquor and the solids in each stage, the liquor separated from each extraction stage having soluble humic acids dissolved therein from the Aguja, introducing the liquor from each extraction stage to the previous extraction stage with the final liquor being discharged from the first extraction stage, adding potassium hydroxide to said liquor having humic acids therewith to establish a pH of at least about 9 for creating water dispersible humates in the final liquor from the first extraction stage to which the Aguja is introduced, separating said final liquor from the humus material treated, adding to said final liquor a material selected from the group consisting of carbon dioxide, carbonic acid, hydrochloric acid, and nitric acid to thereby neutralize the excess alkali, and thereafter removing substantially all of the water from said humates to produce substantially dry humates.

8. A process for separating humates from Aguja and for concentrating said humates for providing soil conditioners and fertilizers, comprising the steps of, introducing water into a multi-stage countercurrent flow with respect to Aguja thereby forming a liquor, agitating the liquid and the Aguja in each stage and separating the liquor and the solids in each stage, the liquor separated from each extraction stage having soluble humic acids dissolved therein from the Aguja, introducing the liquor from each extraction stage to the previous extraction stage with the final liquor being discharged from the first extraction stage, adding sodium hydroxide to said liquor having humic acids therewith to establish a pH of at least about 9 for creating water dispersible humates in the final liquor from the first extraction stage to which the Aguja is introduced, separating said final liquor from the humus material treated, adding to said final liquor a material selected from the group consisting of carbon dioxide, carbonic acid, hydrochloric acid, and nitric acid, to thereby neutralize the excess alkali, and thereafter removing substantially all of the water from said humates to produce substantially dry humates.

9. A process for separating humates from humus materials in a solid state and for concentrating said humates for providing soil conditioners and fertilizers, comprising the steps of, introducing water into a multi-stage countercurrent flow with respect to a humus material thereby forming a liquor, agitating the liquid and the humus material in each stage and separating the liquor and the solids in each stage, the liquor separated from each extraction stage having soluble humic acids dissolved therein from the humus material, introducing the liquor from each extraction stage to the previous extraction stage with the final liquor being discharged from the first extraction stage, adding an alkali selected from the group consisting of sodium hydroxide, potassium hydroxide, and ammonium hydroxide to said liquor having humic acids therewith to establish a pH of at least about 9 for creating water dispersible humates in the final liquor from the first extraction stage to which the humus material is introduced, adding to said final liquor a material selected from the group consisting of carbon dioxide, carbonic acid, hydrochloric acid, and nitric acid to thereby neutralize the excess alkali, then partially evaporating said final liquor to a syrupy consistency, thereafter drying such liquor to produce the humates in a dry form substantially free of liquid, and thereafter using said humates as a soil conditioner and fertilizer without further chemical change in the composition of the humates.

References Cited in the file of this patent
UNITED STATES PATENTS
821,555     Van Haeften             May 22, 1906
(Other references on following page)

UNITED STATES PATENTS

| | | |
|---|---|---|
| 838,108 | Hammerschlag | Dec. 11, 1906 |
| 1,606,015 | Blackwell | Nov. 9, 1926 |
| 1,817,846 | Reinhardt | Aug. 4, 1931 |
| 2,093,047 | Hudig et al. | Sept. 14, 1937 |
| 2,233,956 | Moore | Mar. 4, 1941 |
| 2,916,853 | Latourette et al. | Dec. 15, 1959 |

OTHER REFERENCES

Mukherjee et al.: "Journal of Colloid Science," vol. 11, pages 240–243, 1956.

Bruttini, A.: Uses of Waste Materials, 1923, published by P. S. King and Son Ltd., London, pages 244–246.

Ser. No. 157,223, Van Reesema (A.P.C.), abandoned, published June 1, 1943.